United States Patent
Di Trapani et al.

(10) Patent No.: US 10,723,103 B2
(45) Date of Patent: Jul. 28, 2020

(54) STRATIFIED PANEL STRUCTURE FOR SUN-SKY-IMITATING LIGHTING SYSTEMS

(71) Applicant: COELUX S.R.L., Lomazzo (CO) (IT)

(72) Inventors: Paolo Di Trapani, Cavallasca (IT); Franco Folcio, Canzo (IT); Simone Bonanomi, Muggio (IT)

(73) Assignee: CoeLux S.r.l., Lomazzo (CO) (IT)

( * ) Notice: Subject to any disclaimer, the term of this patent is extended or adjusted under 35 U.S.C. 154(b) by 143 days.

(21) Appl. No.: 15/777,003

(22) PCT Filed: Nov. 15, 2016

(86) PCT No.: PCT/EP2016/077770
§ 371 (c)(1),
(2) Date: May 17, 2018

(87) PCT Pub. No.: WO2017/085079
PCT Pub. Date: May 26, 2017

(65) Prior Publication Data
US 2018/0345630 A1 Dec. 6, 2018

(30) Foreign Application Priority Data
Nov. 19, 2015 (WO) .................. PCT/EP2015/077171

(51) Int. Cl.
*F21V 21/00* (2006.01)
*B32B 17/10* (2006.01)
(Continued)

(52) U.S. Cl.
CPC .......... *B32B 17/10458* (2013.01); *B32B 7/12* (2013.01); *B32B 17/10036* (2013.01);
(Continued)

(58) Field of Classification Search
CPC ................ B32B 17/10458; B32B 7/12; B32B 17/10036; B32B 17/10614;
(Continued)

(56) References Cited

U.S. PATENT DOCUMENTS

| 8,068,285 B1 | 11/2011 | Flynn | |
| 10,077,884 B2 * | 9/2018 | Di Trapani | ............... F21S 8/02 |

(Continued)

FOREIGN PATENT DOCUMENTS

| GB | 2450192 C | 12/2008 |
| JP | 2014193786 A | 10/2014 |

(Continued)

OTHER PUBLICATIONS

Official Decision of Grant, counterpart Japanese Patent Application No. 2018-526091, dated Jan. 22, 2019, 6 pages total (including English translation of 3 pages).

(Continued)

*Primary Examiner* — Laura K Tso
(74) *Attorney, Agent, or Firm* — DiBernardino McGovern IP Group LLC

(57) ABSTRACT

A chromatic stratified panel structure (100) for generating a sun-sky-imitating effect in lighting systems (1) comprises two cover panels (102, 104) at least one of which being a transparent panel; an adhesive transparent polymeric layer (106) sandwiched between the two inner faces of the two cover panels; and at least one nanoparticle-based Rayleigh-like diffusing coating (108) applied to an inner face of at least one of the two cover panels (102, 104) and/or to a face of the adhesive transparent polymeric layer (106) and forming an interlayer between one of the cover panels (102, 104) and the adhesive transparent polymeric layer (106).

26 Claims, 7 Drawing Sheets

(51) Int. Cl.
  *C03C 17/00* (2006.01)
  *F21V 9/02* (2018.01)
  *F21V 3/10* (2018.01)
  *C03C 27/10* (2006.01)
  *G02B 5/02* (2006.01)
  *B32B 7/12* (2006.01)
  *F21V 7/00* (2006.01)

(52) U.S. Cl.
  CPC .. *B32B 17/10614* (2013.01); *B32B 17/10761* (2013.01); *B32B 17/10788* (2013.01); *C03C 17/007* (2013.01); *C03C 27/10* (2013.01); *F21V 3/10* (2018.02); *F21V 9/02* (2013.01); *G02B 5/0242* (2013.01); *B32B 2250/03* (2013.01); *B32B 2250/40* (2013.01); *B32B 2255/10* (2013.01); *B32B 2255/26* (2013.01); *B32B 2255/28* (2013.01); *B32B 2307/406* (2013.01); *B32B 2307/412* (2013.01); *B32B 2307/414* (2013.01); *B32B 2307/42* (2013.01); *C03C 2217/445* (2013.01); *C03C 2217/475* (2013.01); *F21V 7/00* (2013.01)

(58) Field of Classification Search
  CPC ........ B32B 17/10761; B32B 17/10788; B32B 2250/03; B32B 2250/40; B32B 2255/10; B32B 2255/26; B32B 2255/28; B32B 2307/412; B32B 2307/414; B32B 2307/42; F21V 3/10; F21V 9/02; F21V 7/00; C03C 17/007; C03C 27/10; C03C 2217/445; C03C 2217/475; G02B 5/0242
  USPC .............................................. 362/311.02, 1, 2
  See application file for complete search history.

(56) References Cited

U.S. PATENT DOCUMENTS

| | | | |
|---|---|---|---|
| 2006/0008640 A1* | 1/2006 | Chonan | B32B 17/10018 428/328 |
| 2014/0133125 A1 | 5/2014 | Di Trapani et al. | |
| 2014/0182679 A1 | 7/2014 | Rosenberg et al. | |
| 2014/0203273 A1 | 7/2014 | Kubota | |
| 2015/0158274 A1* | 6/2015 | Yabuki | B32B 17/10779 428/328 |
| 2016/0363777 A1 | 12/2016 | Flynn et al. | |
| 2017/0074486 A1 | 3/2017 | Flynn et al. | |
| 2017/0146204 A1* | 5/2017 | Di Trapani | G02B 19/0066 |
| 2018/0004018 A1* | 1/2018 | Oron | C03C 17/008 |
| 2018/0045957 A1* | 2/2018 | Yamaki | B32B 7/02 |
| 2018/0264784 A1* | 9/2018 | Murofushi | B60J 1/00 |
| 2018/0320376 A1* | 11/2018 | Di Trapani | E04B 9/32 |
| 2018/0335188 A1* | 11/2018 | Di Trapani | F21S 8/026 |
| 2019/0278008 A1* | 9/2019 | Giachino | G02B 5/286 |

FOREIGN PATENT DOCUMENTS

| | | |
|---|---|---|
| WO | 2005087680 A1 | 9/2005 |
| WO | 2009156347 A1 | 12/2009 |
| WO | 2009156348 A1 | 12/2009 |
| WO | 2013042745 A1 | 3/2013 |
| WO | 2014076656 A1 | 5/2014 |
| WO | 2015135560 A1 | 9/2015 |
| WO | 2015172821 A1 | 11/2015 |
| WO | 2015173770 A2 | 11/2015 |
| WO | 2016134733 A1 | 9/2016 |
| WO | 2016146825 A1 | 9/2016 |

OTHER PUBLICATIONS

T.C. Grenfell et al., "Representation of a non-spherical ice particle by a collection of independent spheres for scattering and absorption of radiation," Journal of Geophysical Research, vol. 104, No. D24, pp. 31,697-31,709 (13 total pages), Dec. 27, 1999.

Thomas Lindner, European International Searching Authority, International Search Report and Written Opinion, counterpart PCT Application No. PCT/EP2016/077770, dated Feb. 17, 2017, 12 pages total.

Standard Terminology of Appearance, ASTM International, Designation: E284-09a, downloaded Feb. 2012, pp. 1-23 (23 total pages).

* cited by examiner $G_aAG$ $GA_aG$ $G_aAF$ $G_aAG_b$ $G_a^dAF$ $G_a^eAG$

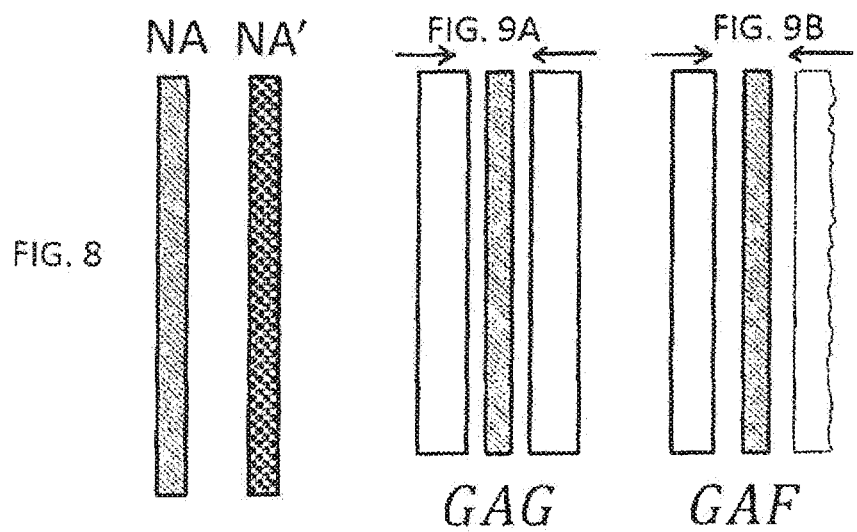
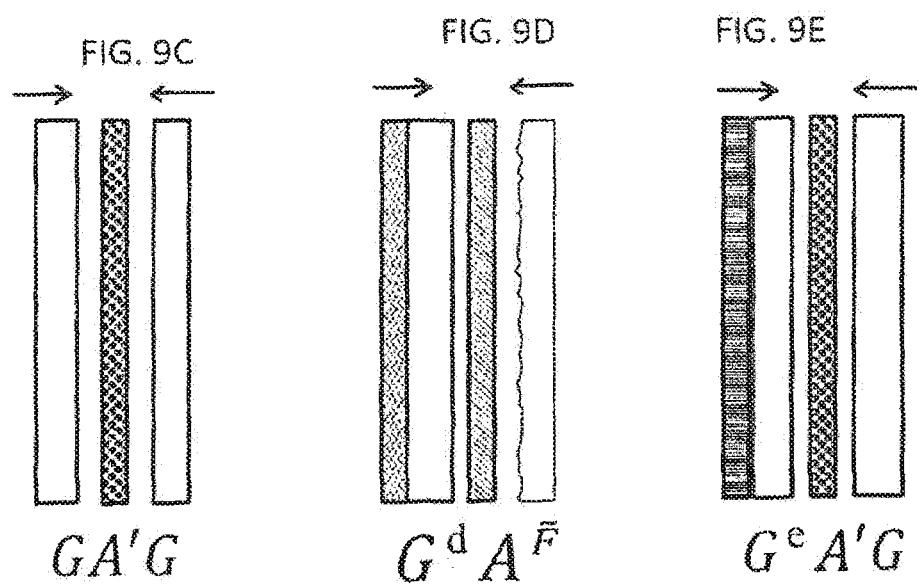

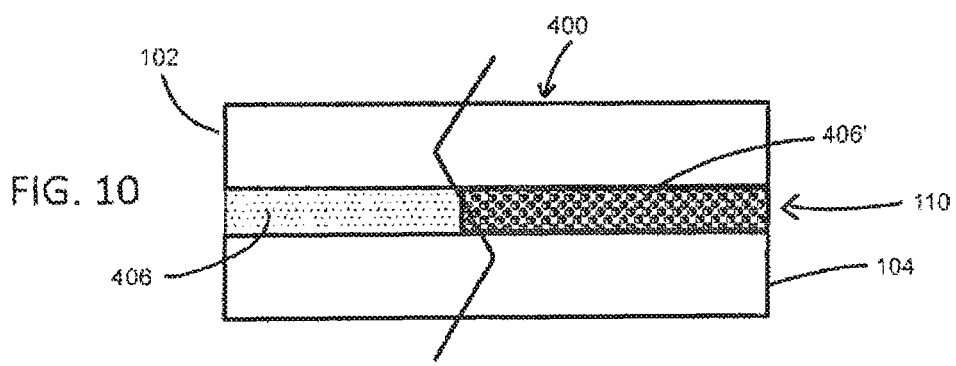

STRATIFIED PANEL STRUCTURE FOR SUN-SKY-IMITATING LIGHTING SYSTEMS

TECHNICAL FIELD

The present disclosure relates generally to lighting systems, in particular to lighting systems fin optically providing a widened perception/impression of the ambient space and in particular for imitating natural sunlight illumination. Moreover, the present disclosure relates generally to panel structures such as glass structures with chromatic features.

BACKGROUND

Several applications of the applicants such as EP 2 304 478 A1, EP 2 304 480 A1, and WO 2014/076656 A1 disclose lighting systems that use a light source producing visible light, and a panel containing nanoparticles used in transmission, i.e., the light source and the illuminated area are positioned on opposing sides of the panel.

Further applications such as the not yet published PCT applications PCT/EP2014/059802 filed on 13 May 2015 and to be published on 19 Nov. 2015 or PCT/EP2015/000407 filed on 23 Feb. 2015 disclose lighting systems that use a light source producing visible light, and a chromatic mirror structure containing nanoparticles used in reflection.

During operation of those lighting systems, the panel receives the light from the light source and acts in transmission as a so-called Rayleigh diffuser, namely it diffuses light rays similarly to the earth atmosphere in clear-sky conditions. Specifically, the concept uses directional light with lower correlated color temperature (CCT), which corresponds to sunlight and generates shadows in presence of lit objects, and diffuse light with larger CCT, which corresponds to the light of the blue sky and, in principal, can generate shadows with a blue tinge.

Generally it is known that coatings can provide properties such as anti-scratch, anti-fog, flame retardant, anti-reflection, optical features and the like. Furthermore, dispersing absorbing pigments in a resin gives the possibility to make chromatic coatings by modifying the spectrum of impinging light on the coating by absorption. Another way to chromatically modifying the spectrum of impinging light is to use nano-sized particles able to diffuse light by Rayleigh-like scattering.

The present disclosure is directed, at least in part, to improving or overcoming one or more aspects of prior systems.

SUMMARY OF THE DISCLOSURE

Some or all of those aspects are addressed by the subject-matters of the independent claims. Further developments of the invention are given in the dependent claims.

Other features and aspects of this disclosure will be apparent from the following description and the accompanying drawings.

BRIEF DESCRIPTION OF THE DRAWINGS

The accompanying drawings, which are incorporated herein and constitute a part of the specification, illustrate exemplary embodiments of the disclosure and, together with the description, serve to explain the principles of the disclosure. In the drawings:

FIG. 8 is an overview of modifications of an adhesive polymeric layer to perform itself Rayleigh-like scattering; and FIGS. 9A to 9E is an overview of further exemplary panel structure configurations using the modified adhesive polymeric layer as an interlayer;

FIG. 10 is a schematic illustration of a further stratified panel structure.

DETAILED DESCRIPTION

Figure 1:
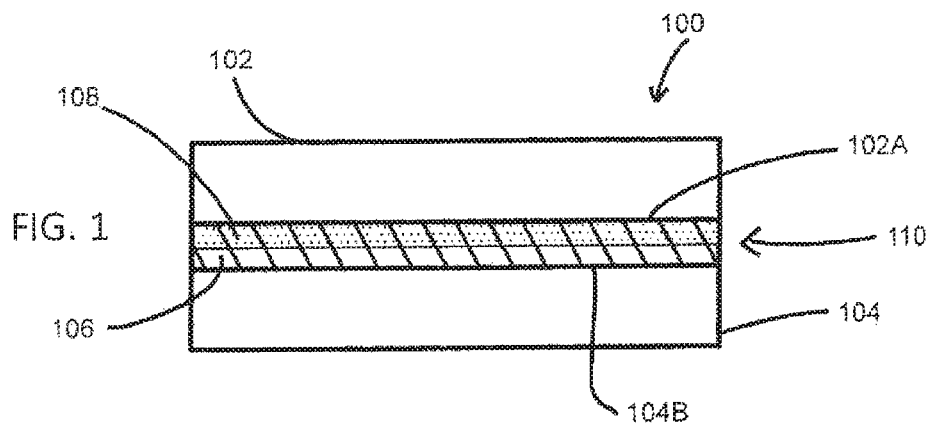
FIG. 1 is a schematic illustration of a stratified panel structure.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The disclosure is based in part on the realization that compact configurations of the herein disclosed Rayleigh-like scattering feature will allow downsizing of lighting systems using the Rayleigh-like scattering feature for sun-sky-imitation effects.

In particular it was realized that implementing the Rayleigh-like scattering based on a coating provided within a sandwich structure such as a stratified glass structure may allow protection of the Rayleigh-like scattering layer as well as simplification of production processes as well as an increase in quality of the homogeneity of the Rayleigh-like scattering layer.

The basic configuration of a chromatic stratified panel structure 100 for generating the sun-sky-imitation possible comprises two cover panels 102, 104. At least one of the two cover panels 102, 104 is configured to provide for the required transmission, i.e. is a transparent panel such as a glass sheet.

An adhesive transparent polymeric layer 106 is sandwiched between two inner faces 102A, 104B of the two cover panels 102, 104. At least one nanoparticle-based Rayleigh-like diffusing coating 108 is applied to one of the inner face 102A, 104B of at least one of the two cover panels 102, 104. Alternatively or additionally, nanoparticle-based Rayleigh-like diffusing coating may be applied to a face of adhesive transparent polymeric layer 106 that prior formation of stratified panel structure 100 is a self-supporting structure and, thus, can act, for example, as a support material for a coating. Nanoparticle-based Rayleigh-like diffusing coating 108, therefore, forms an interlayer between one of the cover panels 102, 104 and adhesive transparent polymeric layer 106. In brief, a four-layer system with the Rayleigh-like diffusing coating/paint is disclosed where the coating/paint is protected inside the stratified e.g., glass structure. In FIG. 1, the layers between cover panels 102, 104 are herein referred to as an adhesive interlayer 110.

Before describing further details and embodiments of chromatic stratified panel structure 100, exemplary sun-sky-imitation lighting system are disclosed. In connection with FIG. 2A, a lighting system in transmission mode with respect to chromatic stratified panel structure 100 is disclosed, and in connection with FIG. 2B, a lighting system in reflection mode with respect to chromatic stratified panel structure 100 is disclosed.

Figure 2A:
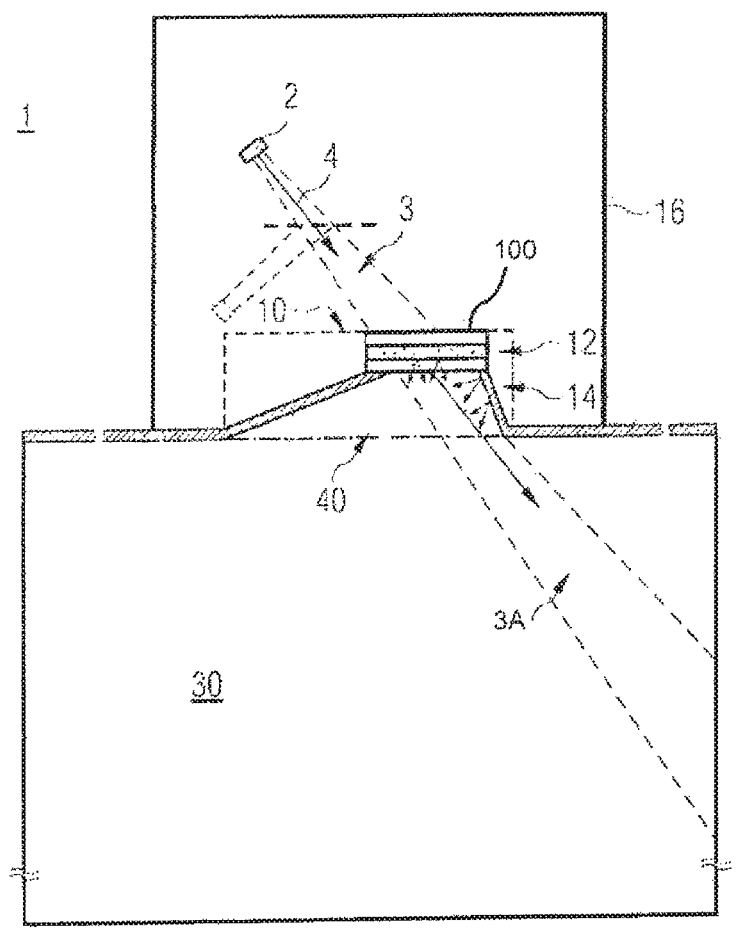
FIGS. 2A and 2B are schematic illustration of exemplary lighting systems using a Rayleigh-like acting panel in transmission and reflection configurations, respectively.

Referring to FIG. 2A, a lighting system 1 is illustrated schematically in a cut view of a room 30.

In detail, lighting system 1 comprises a first light source 2, configured to emit light in an emission solid angle to form a light beam 3 propagating along a main light beam direction 4. Moreover, first light source 2 emits light in the visible region of the light spectrum, for example, with wavelengths between 400 nm and 700 nm. Moreover, first light source 2 emits light (visible electromagnetic radiation) with a spectral width preferably larger than 100 nm, more preferably higher than 170 nm. The spectral width may be defined as the standard deviation of the first light source's wavelength spectrum.

For further details of the exemplary lighting system 1 it is referred to WO2015135560 such as with respect to a lamp shade-like structure 10 with a bottom unit 12 and a screen structure 14 as well as (dark) box 16 and a screen structure 14.

Bottom unit 12 comprises a diffused light generator based on chromatic stratified panel structure 100 disclosed herein and operates as a Rayleigh-like diffuser, which substantially does not absorb light in the visible range and which diffuses more efficiently the short-wavelength in respect to the long-wavelength components of the impinging light, e.g., a panel which substantially does not absorb light in the visible range and which diffuses light at the wavelength 450 nm (blue) at least 1.2 times, for example at least 1.4 times, such as at least 1.6 times more efficiently than light in the wavelength range around 650 nm (red), wherein a diffusion efficiency is given by the ratio between the diffused light radiant power with respect to the impinging light radiant power. Optical properties and microscopic characteristic of Rayleigh like diffusers are also described in detail in the patent application EP 2 304 478 A1 mentioned above. A further insight on the microscopic features is also provided in what follows.

Chromatic stratified panel structure 100 will separate an incident light beam 3 of light source 2 in four components, particularly in:

a transmitted (directed non-diffuse) component (light beam 3A), formed by light rays that pass through and do not experience significant deviations, e.g., is formed by light rays experiencing a deviation smaller than 0.1°; a luminous flux of the transmitted component is a significant fraction of the overall luminous flux incident on diffused light generator 20;

a forward diffuse component, formed by scattered light propagating into lightwell 40/room 30 (with the exception of that light beam direction and of directions differing from that light beam direction by an angle smaller than 0.1°); a luminous flux of the forward diffuse component corresponds to a blue skylight fraction generated from the overall luminous flux incident on chromatic stratified panel structure 100;

a backward diffuse component, formed by scattered light propagating into box 16; a luminous flux of the backward diffuse component is, in general, in the range of but preferably less than the blue skylight fraction; and a reflected component, formed by reflected light and propagating along a direction at a mirror angle into box 16, a luminous flux of the reflected component depends, for example, on the incident angle of the light beam onto chromatic stratified panel structure 100.

That having being stated, the optical properties of chromatic stratified panel structure 100 are such that:

the blue skylight fraction is within the range from 5% to 50%, such within the range from 7% to 40%, or even in the range from 10 to 30%, or within the range from 15% to 20%;

the average CCT of the forward diffuse component is significantly higher than the average correlated color temperature CCT of the transmitted component, for example it may be higher by a factor of 1.2, or 1.3, or 1.5 or more;

chromatic stratified panel structure 100 does not absorb significantly incident light, namely the sum of the four components is at least equal to 80%, or 90%, or even 95%, or 97% or more;

chromatic stratified panel structure 100 scatters mostly forward, namely more than 1.1, or 1.3, or even 1.5, or 2 two times more than is back scattered; and chromatic stratified panel structure 100 may have low reflection, namely less than a portion of 9%, or 6%, or even less than 3%, or 2% of the impinging light is reflected.

Figure 2B:
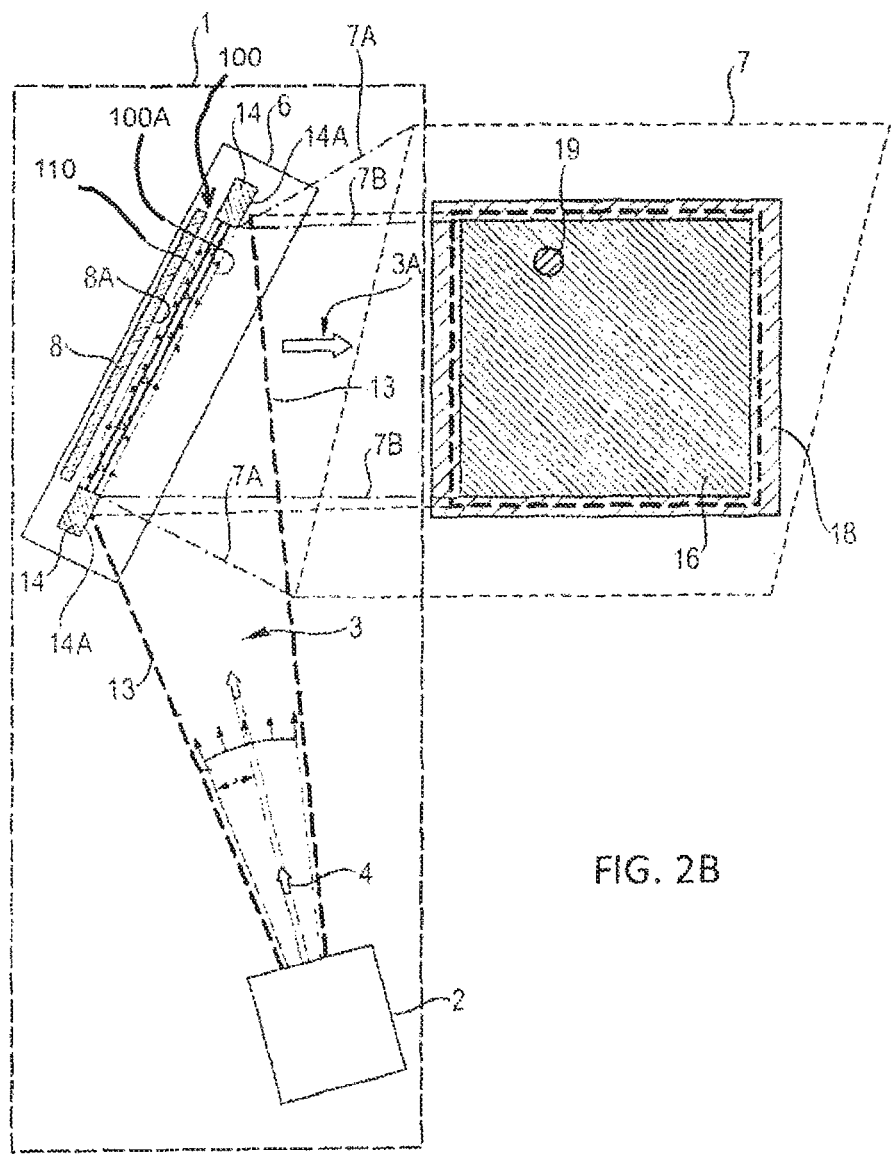

Referring to FIG. 2B, aspects of an optical setup as well as the perceptive aspects of illuminations systems as generally described herein are described for a reflective lighting system 1.

Lighting system 1 comprises again light source 2, configured to emit light in an emission solid angle to form a light beam 3 (in FIG. 1 delimited by dashed lines 13) propagating along a main light beam direction 4 (also referred to as main beam axis). Generally, light source 2 can be, for example, a cool white light source. Exemplary embodiments of light sources may comprise LED based light emitters or discharge lamp based light emitters or hydrargyrum medium-arc iodide lamp based light emitters or halogen lamp based light emitters and respective optical systems downstream of the respective light emitter.

To reduce the dimension of illumination system 1, the optical systems downstream of the respective light emitter may include an optical system such as folding optics (see also FIG. 2A). Illumination system 1 further includes a reflector unit 6 that couples the light originating from light source 2 to a region to be lit up. In general, reflector unit 6 comprises a reflective structure 8 providing a reflective surface 8A and chromatic stratified panel structure 100.

Reflective surface 8A is generally any type of optical acting interface that reflects light having passed through adhesive interlayer 110. For example, reflective surface 8A may be a surface of an aluminum layer or an interface between components, such as a reflective coating. Due to reflective surface 8A, light of light beam 3 being incident on reflective surface 8A is redirected to pass again through chromatic stratified panel structure 100, thereafter forming an illuminating light beam 3A (in FIG. 2B delimited be dash-dash-dotted lines 7A). In FIG. 1, a range 7 of sun-observer locations is illustrated, where it is referred in the wording "sun-observer locations" exemplary to the "sun" because an especially impressive type of embodiments of lighting system 1 relates to sun-like illumination. Illuminating light beam 3A is, thus, directed in the to be illuminated region and comprises directed light (herein also referred to as directed (light) component of the lighting system).

Chromatic stratified panel structure 100 is generally configured for emitting diffuse light (later also referred to as diffuse (light) component of the illumination system) at a first color, e.g., in case of a sky imitation a bluish sky color, extends in front of reflective surface 8A, and comprises a visible front area section 100A that an observer can see when looking at reflector unit 6. In the exemplary embodiment of FIG. 1, a frame-like area 14A of a frame structure 14 extends next to and surrounding visible front area section 100A.

For example, the first color and the second color may be separated in the CIE 1976 (u', v') color space by, at least 0.008 such as at least 0.01, 0.025, or 0.04, where the color difference Δu'v' is defined as the Euclidean distance in the u'v' color space. In particular for sun-imitation configurations, the illuminating light beam CCT of the second color may be close to the Planckian locus (e.g., in the range from 800 K to 6 500 K). In some embodiments the second color may correspond to u'v' points with a maximum distance from the Planckian locus of e.g., 0.06. In other words, a distance from the Planckian locus is, for example in the range from 600 K to 6500 K, given by Δu'v'≤0.060.

As it is apparent to the skilled person, depending on the specific interaction of chromatic stratified panel structure 100 with light beam 3, the color and/or CCT of light beam 3 and illuminating light beam 3A may be essentially identical or may differ. Depending from the type of nanoparticles and their concentration, the CCT difference may be, for example, at least 300 K or even 1 000 K or more.

Looking from within range 7 onto reflector unit 6, an observer may have an optical perception as schematically indicated in FIG. 2B within range 7. The optical perception essentially depends on reflector unit 6 and the light coming therefrom as illustrated by dash-dotted lines 7B being specific for the respective observer position. Specifically, lighting system 1 is configured such that light of significant intensity incident within range 7 of sun-observer locations originates from chromatic stratified panel structure 100. The light of significant intensity comprises light of light beam 3A (originating from light source 2 and being light of light beam 3 redirected by reflector unit 6), and diffuse light originating from visible front area section 10A. In addition, the optical perception will—for the embodiment of FIG. 1—comprise a, for example dark colored, frame-like area 18 around visible front area section 100A.

In line with the optical perception illustrated in FIG. 2B, the observer, when looking from within range 7 of sun-observer locations onto reflector unit 6, will see a large area 16 corresponding to visible front area section 10A based on the homogenously emitted diffuse light at the first color. Large area 16 will be surrounded by frame-like area 18. In addition, the observer will see a sun-like spot 19 at the second color caused by the a reflected (directed non-diffuse) component of the light of light source 2, specifically of illuminating light beam 3A.

Nanoparticle-based Rayleigh-like diffusing material used in the chromatic stratified panel, comprises a solid matrix of a first material (e.g., resins having excellent optical transparency), wherein nanoparticles of a second material (organic or inorganic nanoparticles such as ZnO, TiO2, SiO2, Al2O3 and similar) are dispersed. The refractive indexes of the two materials are different, and this mismatch on the refractive index on the nano-scale is responsible of the Rayleigh-like scattering phenomenon. The absorption of the first and the second material in the visible wavelength range can be considered negligible. Moreover the chromatic stratified panel 100 may be uniform, in the sense that, given any point of the chromatic stratified panel, the physical characteristics of the panel in that point does not depend on the position of that point. The nanoparticles may be monodisperse or polydisperse, they may be spherically shaped or shaped otherwise. In any case the effective diameter d of the nanoparticles falls within the range [5 nm-350 nm], such as [10 nm-250 nm], even [40 nm-180 nm], or [60 nm-150 nm], where the effective diameter d is the diameter of the equivalent spherical particle, namely the effective diameter spherical particle having similar scattering properties as the aforementioned nanoparticles.

Diameter, refractive index mismatch and areal density (number per square meter) of the nanoparticles are the parameters that define the cross section of the scattering phenomenon in the chromatic panel. In addition, the amount of the impinging light scattered from the chromatic panel increases by increasing one of the parameters mentioned above. In order to simplify the description we can consider just the regular transmittance property T(λ) of the material at a certain wavelength. Herein, as defined in the Standard Terminology of Appearance, ASTM international. E 284-09a, the transmittance is in general the ratio of the transmitted flux to the incident flux in the given conditions. The regular transmittance T(λ) is the transmittance order the undiffused angle, i.e. the angle of incidence. In the context of the present disclosure, for a given wavelength and a given position on the chromatic diffusing layer, the regular transmittance is intended for non-polarized incident light with an incident angle corresponding to the main light beam propagation.

To obtain a sun-sky-imitation lighting system, some particular range of regular transmittance are required. Note that both the first material (the matrix) and the second material (nanoparticles) are almost non-absorbing in the visible range, so the portion of the light that is not regular transmitted is totally scattered in the Rayleigh-like scattering mode. Regarding the transmission configurations as the one described in FIG. 2A the regular transmittance for the blue T[450 nm] may be in general within the range [0.05-0.9]. In particular in some embodiments aiming at a pure clear sky the range would be [0.3-0.9], such as [0.35-0.85] or even [0.4-0.8]; in the embodiments aiming at a Nordic sky the range would be [0.05-0.3], such as [0.1-0.3] or even [0.15-0.3]. Since the transmittance measurement is a feasible way to evaluate the optical properties of the presented materials, herein this approach is applied similarly to the reflective chromatic stratified panels.

Considering that in the reflection configuration (FIG. 2B) the nano-loaded scattering coating is crossed twice by an impinging light (due to the presence of the mirror), in order to obtain comparable transmittance data with respect to the transmission configuration, the mirror coating has to be removed. The regular transmittance for the blue T[450 nm] of a chromatic stratified panel before the mirroring of the outer surface may be in general within the range [0.2-0.95]. In particular in some embodiments aiming at a pure clear sky the range would be [0.55-0.95], such as [0.6-0.92] or even [0.62-0.9]; in the embodiments aiming, at a Nordic sky the range would be [0.2-0.55], such as [0.3-0.55] or even [0.4-0.55]. The transmittance of a pure clear sky is higher than the one of a Nordic sky. For example, considering the same light source impinging on two chromatic stratified panels, one in the pure clear sky configuration and one in Nordic configuration, the chromatic properties in the sun-sky effect will be different. The sky in the Nordic configuration will be whitish compared to the one in the pure clear sky. The sun in the Nordic configuration will be more yellow than the one in the pure clear sky.

Combining the above features of the nanoparticle-based Rayleigh-like diffusing coating with the structural features disclosed herein may allow addressing one or more aspects of the prior art as will be exemplarily described below for various exemplary embodiments.

The chromatic effect is further based on nanoparticles having a refractive index that is different than the refractive index of the embedding matrix. To scatter, the nanoparticles have a real refractive index $n_p$ sufficiently different from that of the matrix $n_h$, (also referred to as host material) in order to allow light scattering to take place. For example, the ratio m between the particle and host medium refractive indexes $$\left(\text{with } m \equiv \frac{n_p}{n_h}\right)$$

may be in the range 0.5≤m≤2.5 such as in the range 0.7≤m≤2.1 or 0.7≤m≤1.9.

The chromatic effect is further based on the number of nanoparticles per unit area seen by the impinging light propagating in the given direction as well as the volume-filling-fraction f. The volume filling fraction f is given by $$f = \frac{4}{3}\pi\left(\frac{d}{2}\right)^3 \rho$$

with $\rho$ [meter$^{-3}$] being the number of particles per unit volume. By increasing f, the distribution of nanoparticles in the diffusing layer may lose its randomness, and the particle positions may become correlated. As a consequence, the light scattered by the particle distribution experiences a modulation which depends not only on the single-particle characteristics but also on the so called structure factor. In general, the effect of high filling fractions is that of severely depleting the scattering efficiency. Moreover, especially for smaller particle sizes, high filling fractions impact also the dependence of scattering efficiency on wavelength, and on angle as well. One may avoid those "close packing" effects, by working with filling fractions f≤0.4, such as f≤0.1, or even f≤0.01.

The chromatic effect is further based on a number N of nanoparticles per unit area of the chromatic diffusive layer in dependence of an effective particle diameter D=d $n_h$. Thereby, d [meter] is the average particle size defined as the average particle diameter in the case of spherical particles, and as the average diameter of volume-to-area equivalent spherical particles in the ease of non-spherical particles, as defined in [T. C. GRENFELL, AND S. G. WARREN, "Representation of a non-spherical ice particle by a collection of independent spheres for scattering and absorption of radiation", Journal of Geophysical Research 104, D24, 31, 697-31, 709. (1999)]. The effective particle diameter is given in meters or, where specified in nm.

In some embodiments, $$N \geq N_{min} = \frac{7.13 \times 10^{-29}}{D^6}\left|\frac{m^2+2}{m^2-1}\right|^2 \text{ [meters}^{-2}\text{]},$$

(D given in [meters]) and $$N \leq N_{max} = \frac{2.03 \times 10^{-27}}{D^6}\left|\frac{m^2+2}{m^2-1}\right|^2 \text{ [meters}^{-2}\text{]}$$

Considering the transmission configuration:

For example, for embodiments aiming at simulating the presence of a pure clear sky, $$N \geq N_{min} = \frac{7.13 \times 10^{-29}}{D^6}\left|\frac{m^2+2}{m^2-1}\right|^2 \text{ [meters}^{-2}\text{]},$$

(D given in [meters]) and $$N \leq N_{max} = \frac{8.15 \times 10^{-28}}{D^6}\left|\frac{m^2+2}{m^2-1}\right|^2 \text{ [meters}^{-2}\text{]}$$

such as $$N \geq N_{min} = \frac{1.10 \times 10^{-28}}{D^6}\left|\frac{m^2+2}{m^2-1}\right|^2 \text{ [meters}^{-2}\text{]}$$

and $$N \leq N_{max} = \frac{7.11 \times 10^{-28}}{D^6}\left|\frac{m^2+2}{m^2-1}\right|^2 \text{ [meters}^{-2}\text{]},$$

more specifically $$N \geq N_{min} = \frac{1.51 \times 10^{-28}}{D^6}\left|\frac{m^2+2}{m^2-1}\right|^2 \text{ [meters}^{-2}\text{] and}$$

$$N \leq N_{max} = \frac{6.20 \times 10^{-28}}{D^6}\left|\frac{m^2+2}{m^2-1}\right|^2 \text{ [meters}^{-2}\text{]}.$$

In other embodiments aiming at simulating a Nordic sky, $$N \geq N_{min} = \frac{8.15 \times 10^{-28}}{D^6}\left|\frac{m^2+2}{m^2-1}\right|^2 \text{ [meters}^{-2}\text{]},$$

(D given [meters]) and $$N \leq N_{max} = \frac{2.03 \times 10^{-27}}{D^6}\left|\frac{m^2+2}{m^2-1}\right|^2 \text{ [meters}^{-2}\text{]}$$

such as $$N \geq N_{min} = \frac{8.15 \times 10^{-28}}{D^6}\left|\frac{m^2+2}{m^2-1}\right|^2 \text{ [meters}^{-2}\text{] and}$$

$$N \leq N_{max} = \frac{1.56 \times 10^{-27}}{D^6}\left|\frac{m^2+2}{m^2-1}\right|^2 \text{ [meters}^{-2}\text{]},$$

more specifically $$N \geq N_{min} = \frac{8.15 \times 10^{-28}}{D^6} \left| \frac{m^2 + 2}{m^2 - 1} \right|^2 \text{ [meters}^{-2}\text{] and}$$

$$N \leq N_{max} = \frac{1.28 \times 10^{-27}}{D^6} \left| \frac{m^2 + 2}{m^2 - 1} \right|^2 \text{ [meters}^{-2}\text{]}.$$

Considering the reflection configuration:

For example, for embodiments aiming at simulating the presence of a pure clear sky, $$N \geq N_{min} = \frac{3.47 \times 10^{-29}}{D^6} \left| \frac{m^2 + 2}{m^2 - 1} \right|^2 \text{ [meters}^{-2}\text{]},$$

(D given in [meters]) and $$N \leq N_{max} = \frac{4.05 \times 10^{-28}}{D^6} \left| \frac{m^2 + 2}{m^2 - 1} \right|^2 \text{ [meters}^{-2}\text{]}$$

such as $$N \geq N_{min} = \frac{5.65 \times 10^{-29}}{D^6} \left| \frac{m^2 + 2}{m^2 - 1} \right|^2 \text{ [meters}^{-2}\text{] and}$$

$$N \leq N_{max} = \frac{3.46 \times 10^{-28}}{D^6} \left| \frac{m^2 + 2}{m^2 - 1} \right|^2 \text{ [meters}^{-2}\text{]},$$

more specifically $$N \geq N_{min} = \frac{7.13 \times 10^{-29}}{D^6} \left| \frac{m^2 + 2}{m^2 - 1} \right|^2 \text{ [meters}^{-2}\text{] and}$$

$$N \leq N_{max} = \frac{3.13 \times 10^{-28}}{D^6} \left| \frac{m^2 + 2}{m^2 - 1} \right|^2 \text{ [meters}^{-2}\text{]}.$$

In other embodiments aiming at simulating, a Nordic sky, $$N \geq N_{min} = \frac{4.05 \times 10^{-28}}{D^6} \left| \frac{m^2 + 2}{m^2 - 1} \right|^2 \text{ [meters}^{-2}\text{]},$$

(D given in [meters]) and $$N \leq N_{max} = \frac{1.03 \times 10^{-27}}{D^6} \left| \frac{m^2 + 2}{m^2 - 1} \right|^2 \text{ [meters}^{-2}\text{]}$$

such as $$N \geq N_{min} = \frac{4.05 \times 10^{-28}}{D^6} \left| \frac{m^2 + 2}{m^2 - 1} \right|^2 \text{ [meters}^{-2}\text{] and}$$

$$N \leq N_{max} = \frac{7.71 \times 10^{-28}}{D^6} \left| \frac{m^2 + 2}{m^2 - 1} \right|^2 \text{ [meters}^{-2}\text{]},$$

more specifically $$N \geq N_{min} = \frac{4.05 \times 10^{-28}}{D^6} \left| \frac{m^2 + 2}{m^2 - 1} \right|^2 \text{ [meters}^{-2}\text{] and}$$

$$N \leq N_{max} = \frac{6.37 \times 10^{-28}}{D^6} \left| \frac{m^2 + 2}{m^2 - 1} \right|^2 \text{ [meters}^{-2}\text{]}.$$

Summarizing, a light beam passing through a diffusive coating will generate scattered light and transmitted light. The coating features can modify both the spectral properties and the intensity distribution of the transmitted light. In particular the morphology of the coating (i.e. flatness, smoothness or orange peel) may give rise to a phase variation, which implies a modulation of the intensity distribution of the transmitted light. In other words, if the faces of a layer are not parallel, and in particular if there is a modulation in the thickness of that layer, then focusing and defocusing effects occur for an impinging light beam. If a flat top uniform illumination profile passes through such a layer that has a thickness modulation, the outgoing profile has intensity disuniformity.

For the application of sun-sky-imitation, the uniformity in the transmission of an illumination profile is an important feature, if not a feature of paramount importance.

The inventors realized that, when considering a rough (non-planar on a small scale) surface, the phase variation for a light beam increases by increasing the index mismatch between the two media separated by the rough surface. If a coating is exposed to the air, then the mismatch is the one between the coating and the refractive index of air. The inventors realized that a reduction of the refractive index mismatch will decrease the phase variation, and thus it will increase the uniformity in transmission (double transmission in the case of reflective configurations).

Accordingly, the inventors suggest herein inter alia a configuration for a flat transparent support coated with a diffusive paint in which any modifications and distortions of a light beam passing through the coating is reduced due to refractive index adaptation.

With respect to the various layers, it is referred to the respective sections below. In the following, two simplified process for manufacturing chromatic stratified panel structure 100 are disclosed exemplarily for a stratified glass structures.

In the first exemplary process illustrated in FIG. 3A, a glass sheet 202 is coated with a nanoparticle loaded (hereinafter nano-loaded) diffusive paint 208 therein also referred to as coating when its dry form is considered). A transparent adhesive polymeric layer 206 (such as a PVB, EVA or similar) is sandwiched between this coated glass 202 and another glass sheet 204 wherein coating 208 is in contact with adhesive layer 206. Through a lamination process, adhesive layer 206 joins the two glass sheets 202, 204. Since the refractive index mismatch between coating 208 and adhesive layer 206 is much lower than the one that would be present between coating 208 and the air and further considering that the flatness of an outer surface of the glass sheets 202, 204 can be achieved much higher than the one achievable with a coating, the intensity profile of a light beam 3 passing through this stratified glass panel structure remains almost unmodified.

Figure 3A:
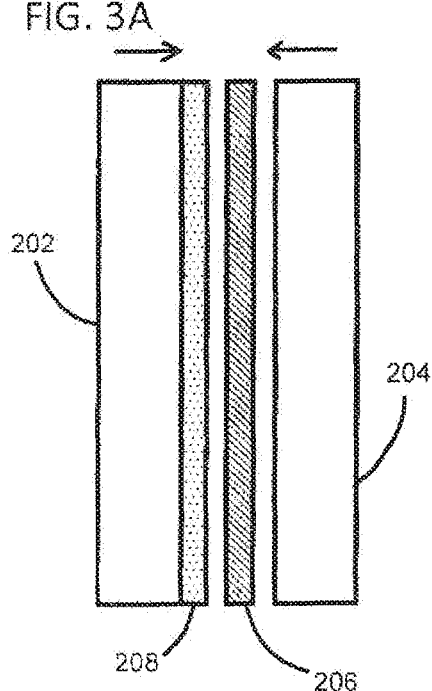
FIGS. 3A to 4C are schematic illustrations of panel structures with one or two nanoparticle-based Rayleigh-like diffusing coatings provided as interlayers.
Figure 3B:
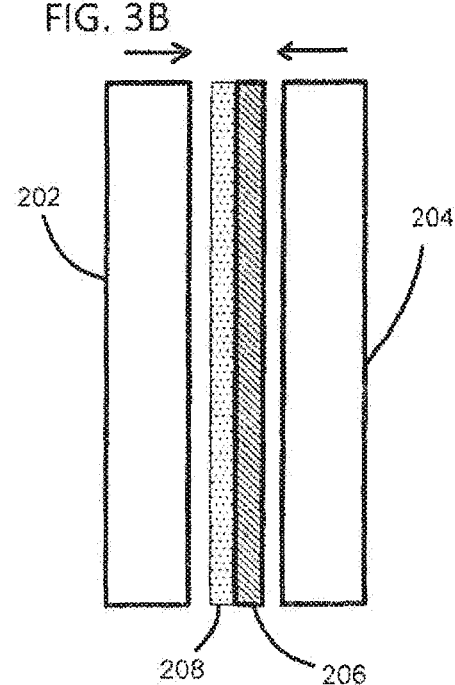

In the second exemplary process illustrated in FIG. 3B, a transparent adhesive polymeric layer 206 (such as a PVB, EVA or similar) is coated with nano-loaded diffusive paint

208. Transparent adhesive polymeric layer 206 is then sandwiched between two glass sheets 202, 204. Through a lamination process, adhesive layer 206 joins the two glass sheets 202, 204. Again, light beam 3 passing through this stratified glass panel structure remains almost unmodified in terms of intensity distribution.

The result for both process can be, for example, a safety dichroic glass sheet with the structure as shown in FIG. 1.

In this system configuration, the diffusing layer may be protected against atmospheric agents like UV light, dust, humidity and so on, which could change the chromatic and optical properties of the diffusing layers. Furthermore the panel may be strong enough in order to fulfill architectural requirements such as fire resistance, shock resistance, scratch resistance and the like.

A typical lamination process of a pair of, for example, 3 mm thick glass sheets and one commercial EVA film in-between the glass sheets starts with bringing the layers in close contact. That assembly is then introduced, for example, in a plastic bag and a low vacuum is applied to the system in order to remove any air in the bag. The vacuum-packed bag can then be introduced in an oven and the temperature be raised to 85° C. (with a raising rate of, for example, 3.5° C./min). The assemble is maintained at that temperature for about 10 min. Subsequently in a second step, the temperature is further raised to about 125° C. (raising, rate 3.5° C./min) and maintained at that temperature for about 30 min. The assembly is than cooled to room temperature in, e.g., about 20 min and the stratified glass panel structure is removed from the plastic bag.

Figure 4A:
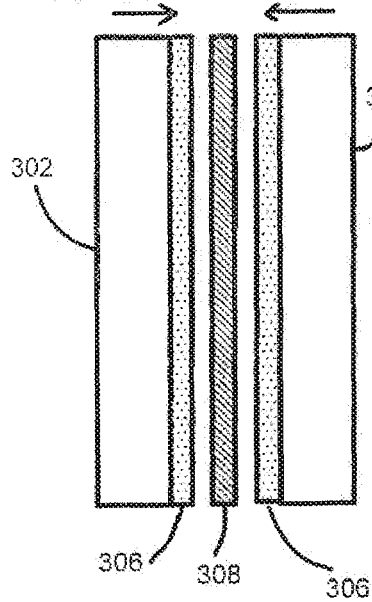
Figure 4B:
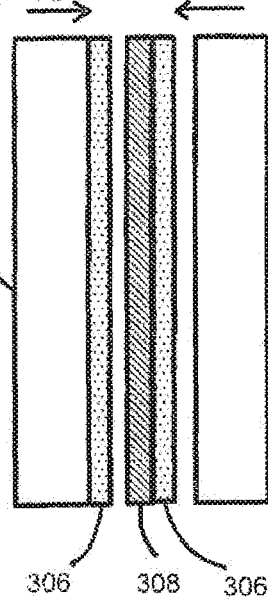
Figure 4C:
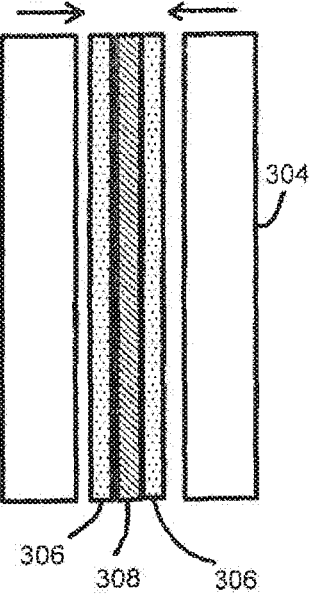

In FIGS. 4A to 4C, starting points of a lamination process is illustrated for a chromatic stratified panel structure with two nano-loaded diffusive coatings 306. In the resulting structure, the layers of nano-loaded diffusive coatings 306 are separated by a transparent adhesive polymeric layer 308.

As can be seen, the starting point of the lamination process can be based on two glass sheets 302, 304 each coated with a nano-loaded diffusive paint 306 at their inner surfaces (FIG. 4A). Alternatively, both sides of transparent adhesive polymeric layer 308 may be coated (FIG. 4C) or one side of one of the glass sheets 302, 304 and transparent adhesive polymeric layer 308 may be coated (FIG. 4B).

The panel structure generally comprises three main free stranding (self-supporting) components suitable for coating purposes therein also referred to as support layer) so that at four internal surfaces need to be joined. This allows up to four internal surfaces being coated with nano-loaded diffusive paint 306, wherein all layers together provide the desired Rayleigh-like scattering effect. In configurations having multiple surfaces coated, the randomness in layer thickness of the various coatings may reduce the overall variations in thickness of the combined layers such that the uniformity with respect to the Rayleigh-like scattering process over the panel structure can be increased.

In general, different type of glass sheets may be used such as normal float glass, tempered, Anti Reflective (AR) coated glass, surface etched glass and similar. In addition, one of the two external glass surfaces of the stratified panel structure may be provided with a reflective coating (i.e. aluminum coating).

In general, by using a structured surface glass in the micrometer scale range, it is possible to achieve a diffusing effect on to transmitted/reflected light. Several methods for creating a microstructured surface glass are known in the art.

Among these, the most extensively applied in the industry involve the treatment of the glass surface with an etching solution comprising hydrofluoric acid as an active component. Different parameters can affect the final results of etching process for example the composition of the etching liquid, the reaction time and temperature, the application method of the etching liquid, the surface quality of the glass and the glass composition. A similar process involving the use of etching cream based on fluoride compounds has been developed in order to minimize problems of toxicity and safety related with the handling of Hydrofluoric Acid.

An alternative technique often used commercially is based on the mechanical abrasion of glass surface—Abrasive Blasting or Sandblasting. In this case air, under high pressure, mixed with an abrasive material is directed towards the glass surface. A deep cut is formed to create the desired custom etched glass.

A less common method involve the use of a mold in a process called Mold Etching. In this case the glass is formed inside a structured mold, when removing the glass, it will have the shape and roughness of the mold. This is one of the cheapest methods in the glass industry.

With respect to the nanoparticle-based Rayleigh-like diffusing coating, herein, the terms "paint", "coating" and "film" refer, in contrast to the term "adhesive polymeric layer", to a layer that is/needs to be applied on a support structure. In contrast, the "adhesive polymeric layer" is considered an independent structural unit.

In general in the application of sun-sky-imitation, a paint may be a clear material that is applied in liquid form on a surface and after a time produces a dry adherent film. Paint is essentially composed of a binder, particles, and a solvent.

Binder refers to the non-volatile portion of the vehicle of a coating material that binds the particles together and the film as a whole to the support substrate. Binders can include synthetic or natural resins and can further be classified according to the mechanisms for drying or curing.

Particles refers to a material, usually with nano or micrometric size that is practically insoluble in the medium and commonly used because of its optical protective or decorative properties. Particles are broadly classified as either organic or inorganic.

A solvent refers to a liquid, single or blended, which is volatile under normal drying conditions and in which the binder is soluble.

Additional components of a paint may be thinners (a volatile liquid, able to facilitate application), catalysts, thickeners, stabilizers, flatteners emulsifiers, adhesion promoters, UV stabilizers etc. In addition in order to increase the adhesion of the paint to the desired substrate a primer can be used before application.

The herein disclosed paints/coatings/films can be made by using as a binder an organic polymer commonly used in industry such as polystyrene, polyurethane, acrylics, alkyd polymer, polyester, siloxane-containing polymer, epoxy-containing polymer etc. or a combination of them. In addition, depending on the nature of the binder different types of a diluting agent can be added, including water or organic (i.e. alcohol, ethers, ketone, esters, aliphatic and aromatic hydrocarbons or others) acting as solvent. Examples of solvent commonly employed in the coating industries include, for example, xylene, hexane, acetone, diethyleneglycol, and isopropyl alcohol.

The nature of binder and the relative amount of components added in the resulting paint mixture will depend on several parameters such as the glass surface properties, the application method, and the interaction of the coating with the adhesive layer during the lamination process.

The material for the nanoparticles or their core may be made with one or more materials that essentially do not absorb light in the visible range having an organic or inorganic nature. In the first case, the inventors are referring to polymers (optionally crosslinked) while in the second case preferably to metal oxides (e.g., TiO2, SiO2, ZnO, ZrO2, Fe2O3, Al2O3, Sb2SnO5, Bi2O3. CeO2 or a combination thereof) with a single phase structure or a core/shell structure. The external surface of the nanoparticle core is preferably functionalized with a specific organic coating in order to guarantee an optimal compatibility and dispersion in the paint matrix. A poor compatibility of nanoparticles with the paint matrix may lead to the formation of large aggregate/agglomerates and inhomogeneous distribution that will strongly affect the scattering properties of the diffusing coating and consequently of the resulting embodiment.

The particle sizes (of particles intended to be contribute to the Rayleigh-like scattering) may be selected to obtain the required chromatic properties. For example, diameter size may be between about 5 nm to 250 nm such as between 20 nm and 150 nm.

Functionalized nanoparticles may be introduced directly in the binder/solvent mixture or in the paint with the desired final composition. The dispersion process may use low/high shear mixing equipment such as magnetic stirrer and/or static mixers.

The coating can be applied on the glass or directly on the adhesive polymeric layer by commonly used processes such as dip coating, spray coating, inkjet coating, electrodeposition, serigraphy and similar.

Referring to the adhesive polymeric layer, suitable materials mainly include that one typically employed in the stratification industry such as transparent thermoplastic materials (TPU or PVB, EVA) or transparent thermoset material (EVA). At present EVA and PVB covered almost 100% of the production of the stratified glass.

EVA (PEVA) PolyEthylene-vinyl acetate, is the copolymer of ethylene and vinyl acetate. The weight percent vinyl acetate usually varies from 10% to 40%, with the remainder being ethylene. Different mechanical/adhesive and chemical properties varying depending on the ratio between ethylene and vinyl acetate employed during the synthetic process. The main advantages of EVA are related to its excellent transparency, good adhesion and compatibility, resistance to humidity and long term reliability.

PVB: Poly(Vinyl Butyral) is prepared from polyvinyl alcohol by reaction with butyraldehyde. Elasticity, mechanical strength, toughness, high light transmission and the adhesion to glass are the most significant PVB properties.

In the following, a syntax for describing chromatic stratified panel structures under consideration of additional coatings and number of coatings is described.

Figure 5:
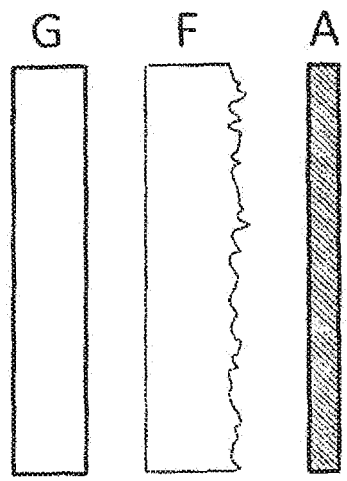
FIG. 5 is an overview of three support materials for exemplary panel structures.

The syntax is based on support materials shown in FIG. 5 wherein G represents a glass panel (or generally a light transmitting panel), F represents a microstructured surface glass (i.e. a support material with one side being provided with a microstructure) and A represents an adhesive polymer layer.

For each type of support material, the sides are identified by indices "j" and "i".

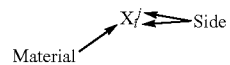

For the materials forming the out layers such as the "glass panel" and the "microstructured surface glass", in $G_i^o$ and $F_i^o$ "j" refers to the outer side, "o", and "i" to the inner side, "i".

For the inner sandwiched material "adhesive polymeric layer", in $A_i^r$ "j" refers to the right side, "r", and "i" to the left side, "l".

Figure 6:
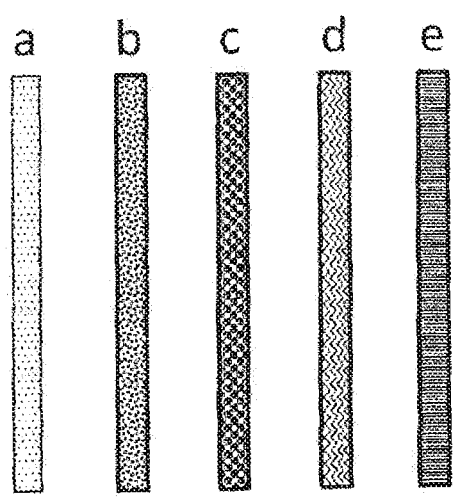
FIG. 6 is an overview of an exemplary coatings to be applied on selective surfaces of the support materials.

Furthermore, the syntax is based on coating types shown in FIG. 6 that include a nanoparticle-based Rayleigh-like diffusing coating (a), a microparticle-based diffusing coating (b), a coating combining nanoparticle-based Rayleigh-like diffusing and microparticle-based diffusing (c), antireflective coating (d), and a mirror (reflective e.g. in the visible) coating (e).

The nanoparticle-based Rayleigh-like diffusing coating (a) has been described before with respect to its scattering features.

The microparticle-based diffusing coating (b) is obtained with the same procedure stated above in the case of nanoparticles diffusing coating but adding particles with a micrometric size instead of nanometric size. More specifically the desired particles size range is comprised between 1 μm to 20 μm. Materials composing the particles can have organic or inorganic nature, in the first case we refer mainly to polymers while in the second case to metal oxide or similar preferably not absorbing in the visible. As in the case of nanoparticles, additional functionalization can also be included on the microparticle's surface in order to increase the compatibility between the particles and the transparent paint.

Microparticles may be present in an amount of about 1 to about 40% (w/w) with respect to the binder. The resulting coating after paint dry may have a thickness of about 2 μm to about 100 μm. These particles are beyond of the Rayleigh scattering regime because of their size. Both the chromatic and the distribution intensity of the light scattered by these microparticles are different to the one scattered by the nanosized particles. The spectrum and the intensity of the scattered light is strongly dependent to the scattering angle. In general, considering a sample of microparticles not perfectly monodispersed, the scattered light will be mostly forward scattered without any dependence on the wavelength. By increasing the microparticles size, the scattering angle (the cone angle defined by the intensity profile of the forward scattering) becomes narrower. The microparticle diffusive layer provokes a blurry effect on the panel.

The coating (c) combines the nanoparticle-based Rayleigh-like diffusing features and the microparticle-based diffusing features.

The antireflective coating (d) is a physico-chemical surface treatment that allows increasing the regular transmittance of a material. This treatment has to be optimized on a defined wavelength range (visible range for the present application) and strongly depends on the optical properties of the materials facing the antireflective coating. An antireflective coating optimized for the interface glass-air in the visible spectrum, makes the panels shown in FIG. 2 more efficient in terms of transmittance and decrease the intensity of the reflected scene.

The mirror coating (e) can be applied on the outer surface of the stratified panels in order to obtain high quality surface chromatic stratified mirror. A typical way to produce mirror is to deposit metals such as aluminum or silver on a glass surface. The reflection efficiency depends on the deposited material and the quality of the reflected image depends on the flatness/roughness of the glass.

The various surfaces defined for the support materials A, G, and F can be coated, for example, with the following coating types:

For $A_i^r$, "l" and, "r" can be (a), (b), or (c).

For $G_i^o$, "i" can be (a), (b), or (c), while "o" can be (b), (d) or (e).

Furthermore, for $F_i^o$ identifies that the microstructure is located on the external side while $\widetilde{F_i^o}$ identities that the structure is located on the internal side.

If there is no index listed, that means that no coating was applied.

Figure 7A:
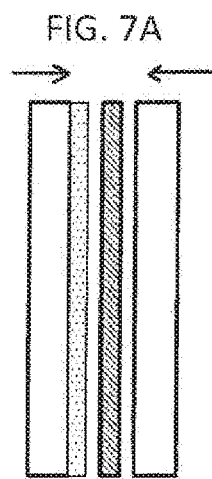
FIGS. 7A to 7F is an overview of exemplary panel structure configurations using an adhesive polymeric layer as an interlayer.
Figure 7B:
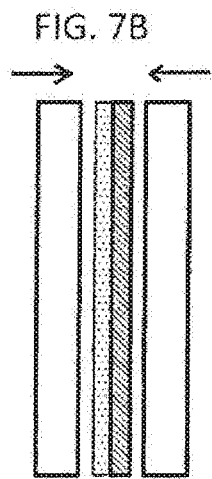

Based on the above, FIGS. 7A to 7F illustrate exemplary sandwich structures, FIGS. 7A and 7B correspond to FIGS. 3A and 3B, respectively.

Figure 7C:
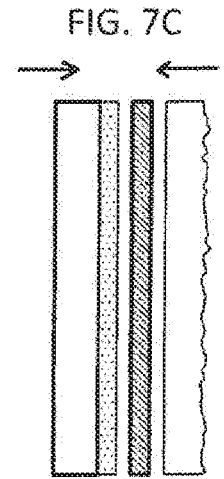

FIG. 7C illustrates a sandwich structure having a microstructure on one outer surface. A microstructure surface has the effect of blurring the perceived scene behind the microstructure surface. This property may be desired because those objects seen through (unwanted structures beyond) and virtual images on the panel (reflected images coming from objects of the scene) will be perceived blurry. Accordingly, the variation of the luminance—typical in an observed surface—may originally have sharp edges but can be smoothed by the microstructure surface based, thereby enhancing the depth perception.

Figure 7D:
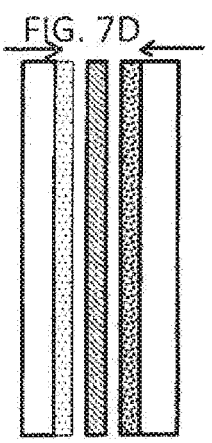

FIG. 7D illustrates a structure similar to FIG. 4B, wherein, one nanoparticle-based Rayleigh-like diffusing coating is replaced with a microparticle-based diffusing coating such that forward scattering and a respective blurring effect is introduced.

Figure 7E:
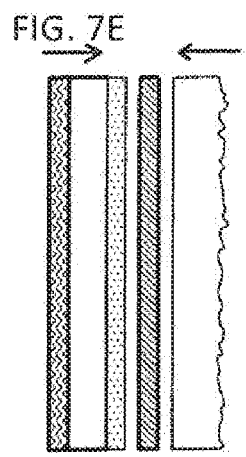

FIG. 7E illustrates a sandwich structure having a microstructure on one outer side and an antireflective coating on the inner side. In this case the antireflective coating allows, for example, increasing the transmittance of the panel, thereby making the lighting system more efficient.

Figure 7F:
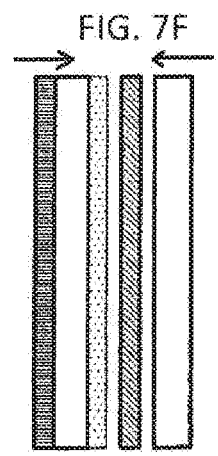

FIG. 7F illustrates a sandwich structure having a mirror coating on one outer side. This configuration can be used in the reflection mode as the lighting system described in connection with FIG. 2B.

The stratified configurations described up to here included at least one coating providing nanoparticle-based Rayleigh like scattering. In the following, a generic three layer structure is disclosed that incorporates the nanoparticle-based Rayleigh like scattering within the adhesive layer. Accordingly, the embodiments are modified in that the diffusing property of the diffusing layer is transferred from a separate coating, being applied e.g. on the interface surfaces including on the side wall of a stand alone adhesive polymeric layer, to being directly inside in the polymeric adhesive layer.

Accordingly, those new embodiments comprises a stratified-glass panel structure composed of two float glass sheets 104 and 106 sandwiching, and affixed to each other, by way of an adhesive transparent polymeric layer (e.g. an EVA, PVB layer or similar) that is loaded with nanoparticles. In further configurations, the adhesive polymeric layer can—in addition to nanoparticles—be loaded with (larger) microparticles together.

The modified adhesive transparent polymeric layer is herein referred to as nanoloaded adhesive polymeric layer. A nanoloaded adhesive polymeric layer may be obtained by different processes available in the industry. One possible process may comprise melting of a solid thermoplastic resin in an extruder followed by addition of the desired amount of nanoparticles. After blending the two component, the mixture is extruded in sheet form with the desired thickness. The method may further comprises pre-mixing the solid thermoplastic resin and the nanoparticles prior to melting the solid thermoplastic resin.

A second type of process may comprise a direct dissolution and mixing of the nanoparticles with monomers (the simplest unit, or the repeating unit, of a polymer) prior of the polymerization process. This process can lead to a higher degree of dispersion of the nanoparticles even though it has some drawback for the scale up in an industrial plant.

As for the case of a nanoparticle coating, the adhesive polymeric layer may be based on suitable materials including those that are typically employed in the stratification industry such as transparent thermoplastic materials (TPU or PVB, EVA) or transparent thermoset material (EVA).

Nanoparticles and microparticles features (material type, size etc.) are the same as previously stated for the nanoparticle coating.

In order to maintain a good nanoparticle dispersion inside the polymeric adhesive layer, and consequently in the final stratified structure, it may be convenient to modify the surface structure of the nanoparticles itself with a specific agent (molecule, polymer etc.) able to guarantee a good compatibility between the particles and the polymeric layer.

In a similar way microparticles may be added during the mixing process together with the nanoparticles.

As will be apparent the integration of nanoparticles from the coating into the adhesive layer allows simplifying the process from an industrial point of view.

The inner sandwiched material, i.e. the "adhesive polymeric layer" used for incorporating the nanoparticle for the Rayleigh-like diffusing, is referred to in the syntax introduced above as NA. In an alternative configuration, the inner sandwiched material "adhesive polymeric layer" may be used for incorporating microparticles for diffusing light—additionally to the nanoparticles for the Rayleigh-like diffusing. Herein, that layer is referred to as NA'. Respective support structures are schematically indicated in FIG. 8 similar to FIG. 5, which also illustrates the glass panels G and F.

It is noted that in the case of most simple sandwich structures, none of the support structures has an "inner" coating, i.e. NA'l is only NA (same for NA') and $G^o i$ is only $G^o$.

The outer surfaces defined for the materials can be coated, for example, with an antireflective coating (d), and a mirror (reflective e.g. in the visible) coating (e).

Based on the above, FIGS. 9A to 9E illustrate exemplary sandwich structures. The embodiments of FIGS. 9A and 9B correspond to simple three-layer structures without and with a microstructured outer surface, respectively.

The embodiment of FIG. 9C combines Rayleigh-like scattering features with forward scattering features.

The embodiment of FIG. 9D uses microstructure at the inner side of one of the glass panels for diffusing, thereby also strengthening the adhesion between NA and that glass panel. In addition, an outer side is coated with an antireflecting coating to e.g. suppress any back scattering from the background.

The embodiment at FIG. 9E relates to the reflective lighting system configurations and uses a coating combining nanoparticle-based Rayleigh-like diffusing and microparticle-based diffusing to similarly suppress any back scattering from the background. It is noted that only exemplary configurations are illustrated in FIGS. 7A to 7F and FIGS. 9A to 9E. Further embodiments are identifiable based on the present disclosure.

As described above for the nano-coating embodiment, the structural elements based on the above considerations such as the ones illustrated in FIGS. 9A to 9E may be subject to a lamination process as described above (illustrated schematically by arrows in the drawings).

FIG. 10 schematically shows a resulting chromatic stratified panel structure 400 e.g. for generating a sun-sky-imitating effect in lighting systems. Chromatic stratified panel 400 comprises two cover panels 102, 104, at least one of which being a transparent panel and/or having a microstructure surface at one side. Chromatic stratified panel 400 comprises further as an interlayer 110, an adhesive transparent polymeric layer 406 (left side of the embodiment illustrated in FIG. 10) as described above or a modified adhesive polymeric layer 406' incorporating microparticles for diffusing light in additionally to the nanoparticles for the Rayleigh-like diffusing (right side of the embodiment illustrated in FIG. 10) as also described above. The adhesive polymeric layers 406, 406' are sandwiched between the two inner faces of the two cover parcels 102, 104. Moreover, they may be essentially transparent in the visible.

Although the preferred embodiments of this invention have been described herein, improvements and modifications may be incorporated without departing from the scope of the following claims.

The invention claimed is:

1. A lighting system comprising:
a light source configured to generate a visible light beam;
a chromatic stratified panel structure illuminated by the light source,
wherein the chromatic stratified panel structure is selected from one of the following:
a chromatic stratified panel structure configured to generate a sun-sky-imitating effect, the chromatic stratified panel structure comprising:
two cover panels at least one of which being a transparent panel;
an adhesive transparent polymeric layer sandwiched between the two inner faces of the two cover panels; and
a chromatic diffusing interlayer between one of the cover panels and the adhesive transparent polymeric layer, the chromatic diffusing interlayer being configured as at least one coating comprising nanoparticles, the at least one coating being applied to at least one of an inner face of at least one of the two cover panels and a face of the adhesive transparent polymeric layer;
a chromatic stratified glass structure comprising:
two glass sheets;
an adhesive transparent polymeric layer sandwiched between the two glass sheets; and
a chromatic diffusing interlayer configured to scatter short-wavelength components of impinging visible light more than long-wavelength components of impinging visible light, wherein the chromatic diffusing interlayer is configured as a coating of paint comprising nanoparticles applied on a face of one of the two glass sheets facing the adhesive transparent polymeric layer; and
a chromatic stratified glass structure comprising:
two glass sheets;
an adhesive transparent polymeric layer sandwiched between the two glass sheets; and
a chromatic diffusing interlayer configured to scatter short-wavelength components of impinging visible light more than long-wavelength components of impinging visible light, wherein the chromatic diffusing interlayer is configured as a coating of paint comprising nanoparticles on the adhesive transparent polymeric layer;
wherein the chromatic stratified panel structure is configured to form from the generated light beam:
a non-scattered portion comprising the light of the generated light beam that passes through the chromatic stratified panel structure essentially unscattered as an illuminating light beam, and
a scattered portion comprising the light of the generated light beam that is chromatically scattered by the nanoparticles within the chromatic stratified panel structure.

2. The lighting system of claim 1, wherein:
a first color of the scattered portion and a second color of the non-scattered portion are separated in u'v'-color space by at least 0.008; and
a first color of the non-scattered portion is associated with a diffuse light correlated color temperature that is different from or larger than a correlated color temperature of the scattered portion.

3. The lighting system of claim 1,
wherein the light that is chromatically scattered by the nanoparticles within the chromatic stratified panel structure is light having a wavelength spectrum extending in the visible spectrum over at least 150 nm; and
wherein the coating comprises a dispersion of the nanoparticles as light-scattering centers of an average size smaller than 250 nm or having a peak at particle sizes below 250 nm in the particle size distribution.

4. The lighting system of claim 1,
wherein the coating comprises two nanoparticle-loaded coatings acting as chromatic diffusing interlayers, each coating being provided at one side of the adhesive transparent polymeric layer and the neighboring cover panel or the glass sheet.

5. The lighting system of claim 1, wherein a number N of nanoparticles acting as chromatic scatterers per unit area of the chromatic diffusing interlayer is dependent on an effective particle diameter $D = d\, n_h$, with $d$ being the average nanoparticle size and $n_h$ being the refractive index of the coating or paint, respectively, is within the range defined by $$N \geq N_{min} = \frac{7.13 \times 10^{-29}}{D^6} \left| \frac{m^2 + 2}{m^2 - 1} \right|^2 \ [\text{meters}^{-2}],$$

($D$ given in [meters]) and $$N \leq N_{max} = \frac{2.03 \times 10^{-27}}{D^6} \left| \frac{m^2 + 2}{m^2 - 1} \right|^2 \ [\text{meters}^{-2}],$$

wherein m is the ratio between the refractive index of the nanoparticle and the refractive index of the coating or paint.

6. The lighting system of claim 1, wherein the chromatic stratified panel structure further comprises at least one of a nanoparticle-based chromatic diffusing coating, a microparticle-based diffusing coating, a coating combining a nanoparticle-based chromatic diffusing coating and a microparticle-based diffusing coating, an antireflective coating, and a mirror coating.

7. The lighting system of claim 1,
wherein at least one of the two cover panels and the two glass sheets and the adhesive transparent polymeric layer comprises a nanoparticle based small angle diffuser coating.

8. A lighting system comprising:
a light source configured to generate a visible light beam;
a chromatic stratified panel structure illuminated by the light source and comprising nanoparticles, wherein
a portion of the generated light beam forms an illuminating light beam by passing through the chromatic stratified panel structure essentially unscattered, and a portion of the generated light beam is chromatically scattered by the nanoparticles within the chromatic stratified panel structure, and
wherein the chromatic stratified panel structure comprises
two cover panels at least one of which is characterized by at least one of being a transparent panel and having a microstructure surface at one side; and
an adhesive transparent polymeric layer (NA), the adhesive transparent polymeric layer (NA) being sandwiched between two inner faces of the two cover panels, wherein the adhesive transparent polymeric layer comprises
a polymeric layer configured to act as an adhesive base structure during a curing process, wherein the polymeric layer comprises, embedded in a polymer, nanoparticles for chromatic scattering of visible light, wherein a number N of nanoparticles acting as chromatic scatterers per unit area of the polymeric layer is dependent on an effective particle diameter $D=d\, n_h$, with d being the average nanoparticle size and $n_h$ being the refractive index of the polymer, is within the range defined by $$N \geq N_{min} = \frac{7.13 \times 10^{-29}}{D^6} \left|\frac{m^2+2}{m^2-1}\right|^2 \; [\text{meters}^{-2}],$$

(D given in [meters]) and $$N \leq N_{max} = \frac{2.03 \times 10^{-27}}{D^6} \left|\frac{m^2+2}{m^2-1}\right|^2 \; [\text{meters}^{-2}],$$

wherein m is the ratio between the refractive indexes of the nanoparticles and the polymer.

9. The lighting system of claim 8, wherein the number N of nanoparticles acting as chromatic scatterers per unit area is within at least one of the following ranges:

a) $N \geq N_{min} = \frac{7.13 \times 10^{-29}}{D^6} \left|\frac{m^2+2}{m^2-1}\right|^2 \; [\text{meters}^{-2}];$ (D given in [meters]) and $N \leq N_{max} = \frac{8.15 \times 10^{-28}}{D^6} \left|\frac{m^2+2}{m^2-1}\right|^2 \; [\text{meters}^{-2}];$ and b) $N \geq N_{min} = \frac{1.10 \times 10^{-28}}{D^6} \left|\frac{m^2+2}{m^2-1}\right|^2 \; [\text{meters}^{-2}];$ and $N \leq N_{max} = \frac{7.11 \times 10^{-28}}{D^6} \left|\frac{m^2+2}{m^2-1}\right|^2 \; [\text{meters}^{-2}];$ and c) $N \geq N_{min} = \frac{1.51 \times 10^{-28}}{D^6} \left|\frac{m^2+2}{m^2-1}\right|^2 \; [\text{meters}^{-2}];$ and $N \leq N_{max} = \frac{6.20 \times 10^{-28}}{D^6} \left|\frac{m^2+2}{m^2-1}\right|^2 \; [\text{meters}^{-2}].$ 10. The lighting system of claim 8, wherein the number N of nanoparticles acting as chromatic scatterers per unit area is within at least one of the following ranges:

a) $N \geq N_{min} = \frac{3.47 \times 10^{-29}}{D^6} \left|\frac{m^2+2}{m^2-1}\right|^2 \; [\text{meters}^{-2}];$ (D given in [meters]) and $N \leq N_{max} = \frac{4.05 \times 10^{-28}}{D^6} \left|\frac{m^2+2}{m^2-1}\right|^2 \; [\text{meters}^{-2}];$ and b) $N \geq N_{min} = \frac{5.65 \times 10^{-29}}{D^6} \left|\frac{m^2+2}{m^2-1}\right|^2 \; [\text{meters}^{-2}];$ and $N \leq N_{max} = \frac{3.46 \times 10^{-28}}{D^6} \left|\frac{m^2+2}{m^2-1}\right|^2 \; [\text{meters}^{-2}];$ and c) $N \geq N_{min} = \frac{7.13 \times 10^{-29}}{D^6} \left|\frac{m^2+2}{m^2-1}\right|^2 \; [\text{meters}^{-2}];$ and $N \leq N_{max} = \frac{3.13 \times 10^{-28}}{D^6} \left|\frac{m^2+2}{m^2-1}\right|^2 \; [\text{meters}^{-2}].$ 11. The lighting system of claim 8, wherein:
the cover panels are configured as light transmitting support materials, or
the cover panels include a glass sheet or a glass panel or a microstructured surface glass having at one side a microstructure.

12. The lighting system of claim 8,
wherein the adhesive transparent polymeric layer is self-supporting to form a support structure for a coating, or is elastic or its material is selected from the group of polymeric materials comprising transparent thermoplastic materials.

13. The lighting system of claim 8,
wherein the adhesive transparent polymeric layer (NA) comprises a microparticle based small angle diffuser coating.

14. The lighting system of claim 1, wherein:
a direct light correlated color temperature is close to the black body color temperature in the range from 800 K to 6,500 K; or
a direct light correlated color temperature differs from a diffuse light correlated color temperature by a factor of 0.85 or less.

15. The lighting system of claim 1, further comprising:
a reflective coating or an antireflecting coating applied to an outer face of at least one of the two cover panels and glass sheets; or
a reflective coating as an interlayer between one of the two cover panels or glass sheets and the adhesive transparent polymeric layer.

16. The lighting system of claim 1, wherein a number N of nanoparticles acting as chromatic scatterers per unit area within the chromatic stratified panel structure is within one of the following ranges:

a) $N \geq N_{min} = \frac{7.13 \times 10^{-29}}{D^6} \left|\frac{m^2+2}{m^2-1}\right|^2 \; [\text{meters}^{-2}];$ (D given in [meters]) and $N \leq N_{max} = \frac{8.15 \times 10^{-28}}{D^6} \left|\frac{m^2+2}{m^2-1}\right|^2 \; [\text{meters}^{-2}];$ and b) $N \geq N_{min} = \frac{1.10 \times 10^{-28}}{D^6} \left|\frac{m^2+2}{m^2-1}\right|^2 \; [\text{meters}^{-2}];$ and -continued $$N \leq N_{max} = \frac{7.11 \times 10^{-28}}{D^6} \left|\frac{m^2+2}{m^2-1}\right|^2 \text{ [meters}^{-2}\text{]; and}$$

c) $N \geq N_{min} = \frac{1.51 \times 10^{-28}}{D^6} \left|\frac{m^2+2}{m^2-1}\right|^2$ [meters$^{-2}$]; and $$N \leq N_{max} = \frac{6.20 \times 10^{-28}}{D^6} \left|\frac{m^2+2}{m^2-1}\right|^2 \text{ [meters}^{-2}\text{]}.$$

17. The lighting system of claim 1, wherein a number N of nanoparticles acting as chromatic scatterers per unit area within the chromatic stratified panel structure is within one of the following ranges:

a) $N \geq N_{min} = \frac{8.15 \times 10^{-28}}{D^6} \left|\frac{m^2+2}{m^2-1}\right|^2$ [meters$^{-2}$];

(D given in [meters]) and $$N \leq N_{max} = \frac{2.03 \times 10^{-27}}{D^6} \left|\frac{m^2+2}{m^2-1}\right|^2 \text{ [meters}^{-2}\text{]; and}$$

b) $N \geq N_{min} = \frac{8.15 \times 10^{-28}}{D^6} \left|\frac{m^2+2}{m^2-1}\right|^2$ [meters$^{-2}$]; and $$N \leq N_{max} = \frac{1.56 \times 10^{-27}}{D^6} \left|\frac{m^2+2}{m^2-1}\right|^2 \text{ [meters}^{-2}\text{]; and}$$

c) $N \geq N_{min} = \frac{8.15 \times 10^{-28}}{D^6} \left|\frac{m^2+2}{m^2-1}\right|^2$ [meters$^{-2}$]; and $$N \leq N_{max} = \frac{1.28 \times 10^{-27}}{D^6} \left|\frac{m^2+2}{m^2-1}\right|^2 \text{ [meters}^{-2}\text{]}.$$

18. The lighting system of claim 1, wherein a number N of nanoparticles acting as chromatic scatterers per unit area within the chromatic stratified panel structure is within one of the following ranges:

a) $N \geq N_{min} = \frac{3.47 \times 10^{-29}}{D^6} \left|\frac{m^2+2}{m^2-1}\right|^2$ [meters$^{-2}$];

(D given in [meters]) and $$N \leq N_{max} = \frac{4.05 \times 10^{-28}}{D^6} \left|\frac{m^2+2}{m^2-1}\right|^2 \text{ [meters}^{-2}\text{]; and}$$

b) $N \geq N_{min} = \frac{5.65 \times 10^{-29}}{D^6} \left|\frac{m^2+2}{m^2-1}\right|^2$ [meters$^{-2}$]; and $$N \leq N_{max} = \frac{3.46 \times 10^{-28}}{D^6} \left|\frac{m^2+2}{m^2-1}\right|^2 \text{ [meters}^{-2}\text{]; and}$$

c) $N \geq N_{min} = \frac{7.13 \times 10^{-29}}{D^6} \left|\frac{m^2+2}{m^2-1}\right|^2$ [meters$^{-2}$]; and $$N \leq N_{max} = \frac{3.13 \times 10^{-28}}{D^6} \left|\frac{m^2+2}{m^2-1}\right|^2 \text{ [meters}^{-2}\text{]}.$$

19. The lighting system of claim 1, wherein a number of nanoparticles acting as chromatic scatterers per unit area within the chromatic stratified panel structure is within one of the following ranges:

a) $N \geq N_{min} = \frac{4.05 \times 10^{-28}}{D^6} \left|\frac{m^2+2}{m^2-1}\right|^2$ [meters$^{-2}$];

(D given in [meters]) and $$N \leq N_{max} = \frac{1.03 \times 10^{-27}}{D^6} \left|\frac{m^2+2}{m^2-1}\right|^2 \text{ [meters}^{-2}\text{]; and}$$

b) $N \geq N_{min} = \frac{4.05 \times 10^{-28}}{D^6} \left|\frac{m^2+2}{m^2-1}\right|^2$ [meters$^{-2}$]; and $$N \leq N_{max} = \frac{7.71 \times 10^{-28}}{D^6} \left|\frac{m^2+2}{m^2-1}\right|^2 \text{ [meters}^{-2}\text{]; and}$$

c) $N \geq N_{min} = \frac{4.05 \times 10^{-28}}{D^6} \left|\frac{m^2+2}{m^2-1}\right|^2$ [meters$^{-2}$]; and $$N \leq N_{max} = \frac{6.37 \times 10^{-28}}{D^6} \left|\frac{m^2+2}{m^2-1}\right|^2 \text{ [meters}^{-2}\text{]}.$$

20. The lighting system of claim 1, wherein:
the cover panels are configured as light transmitting support materials; or
the cover panels include a glass sheet or a glass panel or a microstructured surface glass having at one side a microstructure.

21. The lighting system of claim 1, wherein the adhesive transparent polymeric layer is self-supporting to form a support structure for a coating, or is elastic or its material is selected from the group of polymeric materials comprising transparent thermoplastic materials.

22. The lighting system of claim 1, wherein the adhesive transparent polymeric layer (NA) comprises a microparticle based small angle diffuser coating.

23. The lighting system of claim 1, further comprising a reflective coating or an antireflecting coating applied to an outer face of at least one of the two cover panels and glass sheets.

24. The lighting system of claim 8, wherein the number N of nanoparticles acting as chromatic scatterers per unit area is within one of the following ranges:

a) $N \geq N_{min} = \frac{8.15 \times 10^{-28}}{D^6} \left|\frac{m^2+2}{m^2-1}\right|^2$ [meters$^{-2}$];

(D given in [meters]) and $$N \leq N_{max} = \frac{2.03 \times 10^{-27}}{D^6} \left|\frac{m^2+2}{m^2-1}\right|^2 \text{ [meters}^{-2}\text{]; and}$$

b) $N \geq N_{min} = \frac{8.15 \times 10^{-28}}{D^6} \left|\frac{m^2+2}{m^2-1}\right|^2$ [meters$^{-2}$]; and $$N \leq N_{max} = \frac{1.56 \times 10^{-27}}{D^6} \left|\frac{m^2+2}{m^2-1}\right|^2 \text{ [meters}^{-2}\text{]; and}$$

c) $N \geq N_{min} = \frac{8.15 \times 10^{-28}}{D^6} \left|\frac{m^2+2}{m^2-1}\right|^2$ [meters$^{-2}$]; and $$N \leq N_{max} = \frac{1.28 \times 10^{-27}}{D^6} \left|\frac{m^2+2}{m^2-1}\right|^2 \text{ [meters}^{-2}\text{]}.$$

25. The lighting system of claim 8, wherein the number N of nanoparticles acting as chromatic scatterers per unit area is within one of the following ranges:

a) $N \geq N_{min} = \dfrac{4.05 \times 10^{-28}}{D^6} \left|\dfrac{m^2+2}{m^2-1}\right|^2$ [meters$^{-2}$];

($D$ given in [meters]) and $N \leq N_{max} = \dfrac{1.03 \times 10^{-27}}{D^6} \left|\dfrac{m^2+2}{m^2-1}\right|^2$ [meters$^{-2}$]; and b) $N \geq N_{min} = \dfrac{4.05 \times 10^{-28}}{D^6} \left|\dfrac{m^2+2}{m^2-1}\right|^2$ [meters$^{-2}$]; and $N \leq N_{max} = \dfrac{7.71 \times 10^{-28}}{D^6} \left|\dfrac{m^2+2}{m^2-1}\right|^2$ [meters$^{-2}$]; and c) $N \geq N_{min} = \dfrac{4.05 \times 10^{-28}}{D^6} \left|\dfrac{m^2+2}{m^2-1}\right|^2$ [meters$^{-2}$]; and $N \leq N_{max} = \dfrac{6.37 \times 10^{-28}}{D^6} \left|\dfrac{m^2+2}{m^2-1}\right|^2$ [meters$^{-2}$].

26. The lighting system of claim 8, further comprising a reflective coating or an antireflecting coating applied to an outer face of at least one of the two cover panels and glass sheets.

\* \* \* \* \*